May 17, 1932.   G. D. BECKER   1,858,815

PACKING

Filed June 23, 1930

Inventor
G. D. Becker
by
Attorney

Patented May 17, 1932

1,858,815

UNITED STATES PATENT OFFICE

GEORGE D. BECKER, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE

PACKING

Application filed June 23, 1930. Serial No. 463,076.

The invention described herein relates to certain improvements in packing, whereby tight joints can be formed simultaneously against opposing surfaces of two mechanical parts or elements, one surrounding the other, and one movable relative to the other, a piston in its cylinder or a piston rod through its stuffing box.

An object of the invention is to provide a packing comprising a body possessing hydraulic characteristics which is surrounded by reinforcing members possessing mechanical characteristics for better withstanding the wear incident to the relative movement of the parts with which the packing is associated and also to give the packing a satisfactory rigidity and strength which mechanical characteristics are almost entirely absent in the incompressible body. Another object of the invention is to provide a packing that is not readily deteriorated or disintegrated by lubricating oils and which therefore may advantageously be used between surfaces normally carrying such oils. Other objects of the invention will be apparent from a reading of the specification and the drawings forming a part of the specification.

Figure 1:
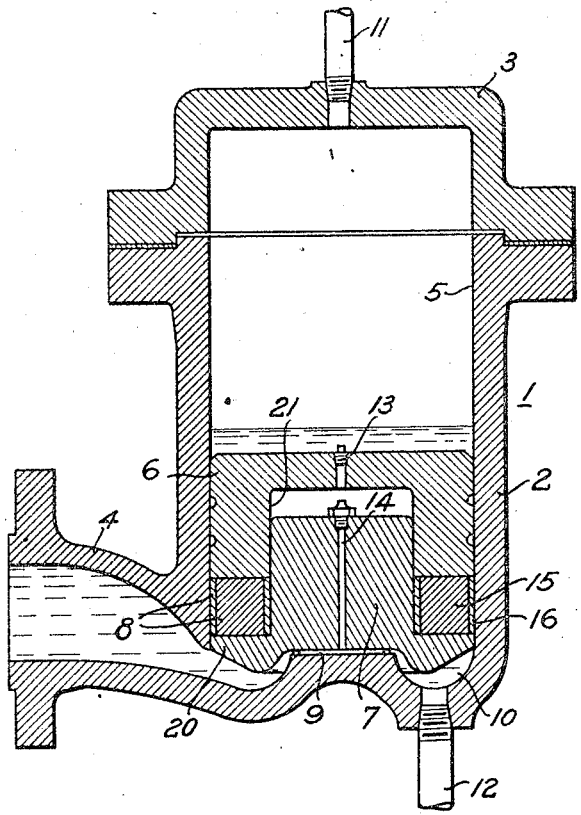
Fig. 1 is a longitudinal transverse section of a pneumatic accumulator in which one form of the improved packing, which forms the basis of this application, is employed.

One type of apparatus in which the improved packing which forms the subject matter of this application may advantageously be employed is illustrated by Fig. 1 which shows a pneumatic accumulator generally designated by the reference numeral 1. The accumulator consists of a casing 2 of a suitable metal and having a flanged extension 4 connected with its bottom. A cup shaped head 3 closes the top of the casing 2 and is firmly held thereto by means of bolts, not shown, passing through annular flanges in the head 3 and casing 2. The casing and head are provided with a cylindrical bore 5 in which reciprocates a piston 6 having an axial bore 21 extending partly therethrough in which the core 7 of cooperating compression plate 20 is received. The piston 6 and core 7 are so proportioned and designed so as to leave a space which permits of a limited telescopic movement of these parts due to compression of the packing 8. The base of the compression plate 20 is of substantially the same diameter as the piston 6. Between the annular edge of the piston and the adjacent base portion of compression plate 20 is located one form of packing 8. This form of packing comprises an annular body 15 of rectangular cross-section consisting of a material having hydraulic characteristics, such as a composition known as factis, a sulphur chloride compound of vegetable oil, or even grease, confined between reinforcing rings 16 of a material, such as leather, having the desired mechanical characteristics, namely, to well withstand wear due to the friction incident to the sliding of the parts and to give the packing the desired strength and rigidity which mechanical characteristics are almost entirely lacking in the incompressible body 15.

The central bottom portion of casing 2 is provided with a depression forming a boss 9 in the interior thereof which serves as a stop for the compression plate 20 and its associated parts and also provides an annular recess 10 therein. A pipe 12 conveying a hydraulic fluid, as for instance lubricating oil, communicates with said recess. An air bleeder plug 13 in a passage in piston 6 is provided to relieve the space between the core 7 and piston 6 of pressure to permit assembly of the parts. And a relief valve in a passage 14 in core 7 is provided to prevent the formation of pressure in said space when the accumulator is operating.

The operation of the accumulator and improved packing therein contained is as follows. Air under pressure is admitted into the casing 2 above piston 6 through a pipe connection 11 in head 3. The load on piston 6 is absorbed by packing 8 until the packing reaches a sufficient pressure to transmit the load to the plate 20 which in turn transmits the load to the hydraulic fluid in the bottom of the accumulator. This pressure or load is transmitted to a piston or other element which it is desired to raise or move by means of the hydraulic fluid confined in a suitable conduit which connects said piston or element with the flanged extension 4, the hydraulic fluid serving as the vehicle to transmit the forces acting on piston 6 due to the air pressure above said piston. As has been stated above the forces acting on the piston 6 will be transmitted to the hydraulic fluid and some proportion of these forces will be used in compressing the body 15 of the packing 8 which being hydraulic and therefore incompressible will cause definite values of forces to act normal to the cylindrical reinforcing rings 16 thereby causing the same to effectively seal the spaces between the rings and the adjacent portions of cylindrical bore 5 and core 7, respectively.

Figure 3:
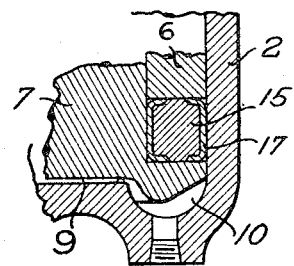
Fig. 3 is a fragmentary cross-section of the accumulator of Fig. 1 and shows another modified form of packing therein.

In the modified form of packing illustrated by Fig. 3 pressed leather cup members 17 are substituted for the plain cylindrical reinforcing ring 16 of the modification shown in Fig. 1. With the reinforcing rings of cup shape, this form of packing may well have grease or other incompressible material as the body 15 although the composition referred to above is the preferred body for this modified packing also.

Figure 2:
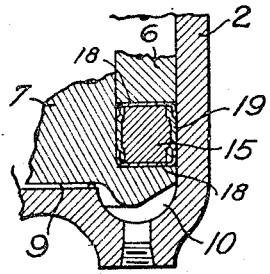
Fig. 2 is a fragmentary cross-section of the accumulator of Fig. 1 and shows a modified form of packing therein.

Fig. 2 illustrates the preferred form of packing. This form of packing comprises a pair of spun metal cups 18 with cylindrical rings 19 of leather between the spaced cups and having their upper and lower edge portions in engagement with the upwardly and downwardly directed flanges of said cups to be retained thereby. The annular space formed by cups 18 and rings 19 is filled by an incompressible body 15, which may be grease or the composition referred to above, which is compressed in the operation of the accumulator and deforms to completely fill the voids provided for it and transmitting the pressure to the reinforcing rings 19 thereby effectively sealing the spaces between said rings and the adjacent portions of cylindrical bore 5 and core 7, respectively.

Although the improved packing has been illustrated and described in connection with a device having a fluid actuated piston for causing the incompressible body 15 to exert its inherently good packing qualities to a maximum degree, it may be exerted to a satisfactory degree in a stuffing box by an adjustable gland and in a cylinder by an adjustable annular shoulder, and the application of the improved packing herein disclosed is by no means limited to the specific pneumatic accumulator shown.

It should be understood that it is not desired to limit the invention to the exact details of construction and operation of the apparatus herein shown and described, for various modifications within the scope of the claims may occur to persons skilled in the art.

It is claimed and desired to secure by Letters Patent:

1. A packing for forming a tight joint between relatively moving surfaces accessible to a lubricant, comprising a body, of a sulphur chloride compound of vegetable oil, and a reinforcing element having mechanical characteristics in contact with and protecting said body from rubbing contact.

2. A packing for forming a tight joint between relatively moving surfaces accessible to a lubricant, comprising a body annular in form and having hydraulic characteristics and a reinforcing ring having mechanical characteristics in contact with a circumferential face of said body and completely overlying said face.

3. A packing for forming a tight joint between relatively moving surfaces accessible to a lubricant comprising an annular body having hydraulic characteristics and a pair of reinforcing rings having mechanical characteristics in contact with the circumferential faces of said annular body and completely overlying said faces.

4. In combination with a casing having a cylindrical bore, a piston in said cylinder, a circular compression plate in said cylinder adjacent said piston and a packing, comprising an incompressible body having hydraulic characteristics and a reinforcing ring having mechanical characteristics in contact with and overlying the outer face of said body, in said cylinder between said piston and said plate, said ring engaging with the surface of said cylinder.

5. In combination with a casing having a cylindrical bore, a piston having an axial bore, defining an annular wall in said piston, fitted in said cylinder, a compression plate having an axial core portion which is received within the bore of said piston, positioned in said cylinder adjacent said piston and a packing comprising an annular incompressible body having hydraulic characteristics and of a substantially rectangular cross-section and reinforcing rings having mechanical characteristics in contact with and overlying the outer and inner faces of said body, in said cylinder between said piston and said plate, said rings engaging with the surfaces of said cylinder and said core, respectively.

In testimony whereof, the signature of the inventor is affixed hereto.

GEORGE D. BECKER.